US010959366B2

(12) United States Patent
Lang et al.

(10) Patent No.: US 10,959,366 B2
(45) Date of Patent: Mar. 30, 2021

(54) POWER TAKE-OFF TRANSMISSION

(71) Applicant: DEERE & COMPANY, Moline, IL (US)

(72) Inventors: Matthias Lang, Mannheim (DE); Rainer Gugel, Plankstadt (DE); David Mueller, Dettenheim (DE)

(73) Assignee: DEERE & COMPANY, Moline, IL (US)

( * ) Notice: Subject to any disclaimer, the term of this patent is extended or adjusted under 35 U.S.C. 154(b) by 96 days.

(21) Appl. No.: 16/359,438

(22) Filed: Mar. 20, 2019

(65) Prior Publication Data

US 2019/0289771 A1    Sep. 26, 2019

(30) Foreign Application Priority Data

Mar. 22, 2018  (DE) .......................... 102018204405.8

(51) Int. Cl.
*A01B 71/06* (2006.01)
*B60K 25/06* (2006.01)
*B60K 17/28* (2006.01)
*F16H 47/04* (2006.01)
*B60K 6/48* (2007.10)
*B60W 20/10* (2016.01)
(Continued)

(52) U.S. Cl.
CPC .............. *A01B 71/06* (2013.01); *B60K 17/28* (2013.01); *B60K 25/06* (2013.01); *B60K 6/365* (2013.01); *B60K 6/48* (2013.01); *B60W 20/10* (2013.01); *B60W 30/1888* (2013.01); *B60Y 2200/221* (2013.01); *B60Y 2300/1888* (2013.01); *B60Y 2410/132* (2013.01); *F16H 47/04* (2013.01)

(58) Field of Classification Search
CPC ........ A01B 71/06; B60K 17/28; B60K 25/06; B60K 6/48; B60K 6/365; F16H 47/04; B60W 20/10; B60W 6/365; B60Y 2300/1888; B60Y 2410/132
See application file for complete search history.

(56) References Cited

U.S. PATENT DOCUMENTS 10,106,175 B1 *  10/2018  Shirchenko ............ G07C 5/008
10,173,662 B2 *   1/2019  Muench ................. B60W 20/11
(Continued)

FOREIGN PATENT DOCUMENTS

DE       2647141 A1    4/1978
DE       2051556 C2    2/1983
(Continued)

OTHER PUBLICATIONS

Scheiblich et al. De 10 2013 021224 Al Machine English Translation, ip.com. (Year: 2014).*
(Continued)

*Primary Examiner* — Karen Beck

(57) ABSTRACT

An agricultural working machine, method, and power take-off transmission are provided. The agricultural working machine includes an internal combustion engine, at least one power take-off, and an arrangement for dynamically adjusting at least one of a speed and a torque of the PTO. The arrangement includes an electric machine and a transmission summing the driving force of the internal combustion engine and the electric machine. The transmission includes at least two gear elements that are magnetically coupled.

13 Claims, 4 Drawing Sheets

(51) Int. Cl.
*B60K 6/365* (2007.10)
*B60W 30/188* (2012.01)

(56) References Cited

U.S. PATENT DOCUMENTS

| | | | |
|---|---|---|---|
| 2006/0214035 A1* | 9/2006 | Albright | A01C 3/06 239/650 |
| 2010/0029428 A1* | 2/2010 | Abe | B60K 6/445 475/5 |
| 2010/0082192 A1* | 4/2010 | Hofbauer | B60L 15/2009 701/22 |
| 2012/0207620 A1* | 8/2012 | Dalum | B60W 20/40 417/44.1 |
| 2012/0277059 A1* | 11/2012 | Akutsu | B60W 30/025 477/5 |
| 2014/0094336 A1* | 4/2014 | Versteyhe | B60K 6/365 475/8 |
| 2014/0230785 A1* | 8/2014 | Kawaguchi | F02D 11/06 123/349 |
| 2018/0180148 A1* | 6/2018 | Peterson | B60K 17/28 |
| 2019/0225079 A1* | 7/2019 | Lang | B60K 23/0808 |
| 2019/0359054 A1* | 11/2019 | Petersen | B60K 17/28 |
| 2020/0055385 A1* | 2/2020 | Rechenbach | B60K 6/547 |
| 2020/0079206 A1* | 3/2020 | Ziemer | B60K 6/48 |

FOREIGN PATENT DOCUMENTS

| | | | |
|---|---|---|---|
| DE | 102011084622 A1 | 4/2013 | |
| DE | 102013021224 * | 8/2014 | B60K 6/48 |
| DE | 102013021224 A1 | 8/2014 | |
| DE | 1020110684623 A1 | 4/2016 | |
| DE | 102017210563 A1 | 1/2018 | |
| DE | 102017209932 A1 * | 12/2018 | F16H 3/663 |
| EP | 2586641 B1 | 5/2014 | |
| EP | 2857246 A2 | 4/2015 | |
| EP | 2628625 B1 | 7/2015 | |
| EP | 2977252 A1 | 1/2016 | |
| EP | 3410588 A1 | 12/2018 | |
| EP | 3513997 A1 * | 7/2019 | B60K 17/3462 |

OTHER PUBLICATIONS

European Search Report issued in counterpart application No. 19164030.9 dated Aug. 16, 2019. (10 pages).

* cited by examiner

POWER TAKE-OFF TRANSMISSION

RELATED APPLICATION

This application claims priority under 35 U.S.C. § 119 to German patent application DE 102018204405.8, filed Mar. 22, 2018, the disclosure of which is incorporated herein by reference in its entirety.

BACKGROUND

The disclosure concerns a power take-off transmission, an agricultural vehicle with a power take-off transmission and the use of a power take-off transmission. Agricultural machines, such as tractors, may be equipped with a power take-off shaft to drive attachable implements. Part of the drive power of a tractor's main drive motor may be provided as an auxiliary drive for the power take-off (PTO). This provides a mechanical drive source that may be switched on at a secondary output of the transmission, especially for tractors. The mechanical drive energy can be used directly via a cardan shaft to drive, e.g., balers, mounted cutter bars, belt drives, or hydraulic pumps.

SUMMARY

Various aspects of embodiments of the present disclosure are set out in the claims.

In accordance with an embodiment of the present disclosure, an agricultural working machine with an internal combustion engine and an auxiliary drive is provided. The agricultural working machine includes at least one power take-off, an arrangement for dynamically adjusting at least one of a speed and a torque of the PTO, wherein the arrangement comprises an electric machine and a transmission summing the driving force of the internal combustion engine and the electric machine, and wherein the transmission comprises at least two gear elements that are magnetically coupled.

In accordance with an embodiment of the present disclosure, a method of operating a magnetic transmission with a power take-off transmission is provided. The method includes dynamically adjusting a speed and a torque of a power take-off shaft in an agricultural machine, wherein the power take-off transmission comprises at least two transmission elements magnetically coupled to each other.

In accordance with an embodiment of the present disclosure, a power take-off transmission for transmitting drive torque to a power take-off is provided. The power take-off transmission includes an arrangement for dynamically adjusting at least one of a speed and a torque of the power take-off with an electric machine configured to be connected to an electrical network; and at least three transmission elements, wherein one of the at least three transmission elements is configured to be connected to an input stage and another of the at least three transmission elements is connected to the electric machine such that a third transmission stage sums initiated torque, wherein at least two of the at least three transmission elements are magnetically coupled to each other.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one embodiment of the subject matter of this disclosure is understood by referring to FIGS. 1 through 4 of the drawings.

Figure 1:
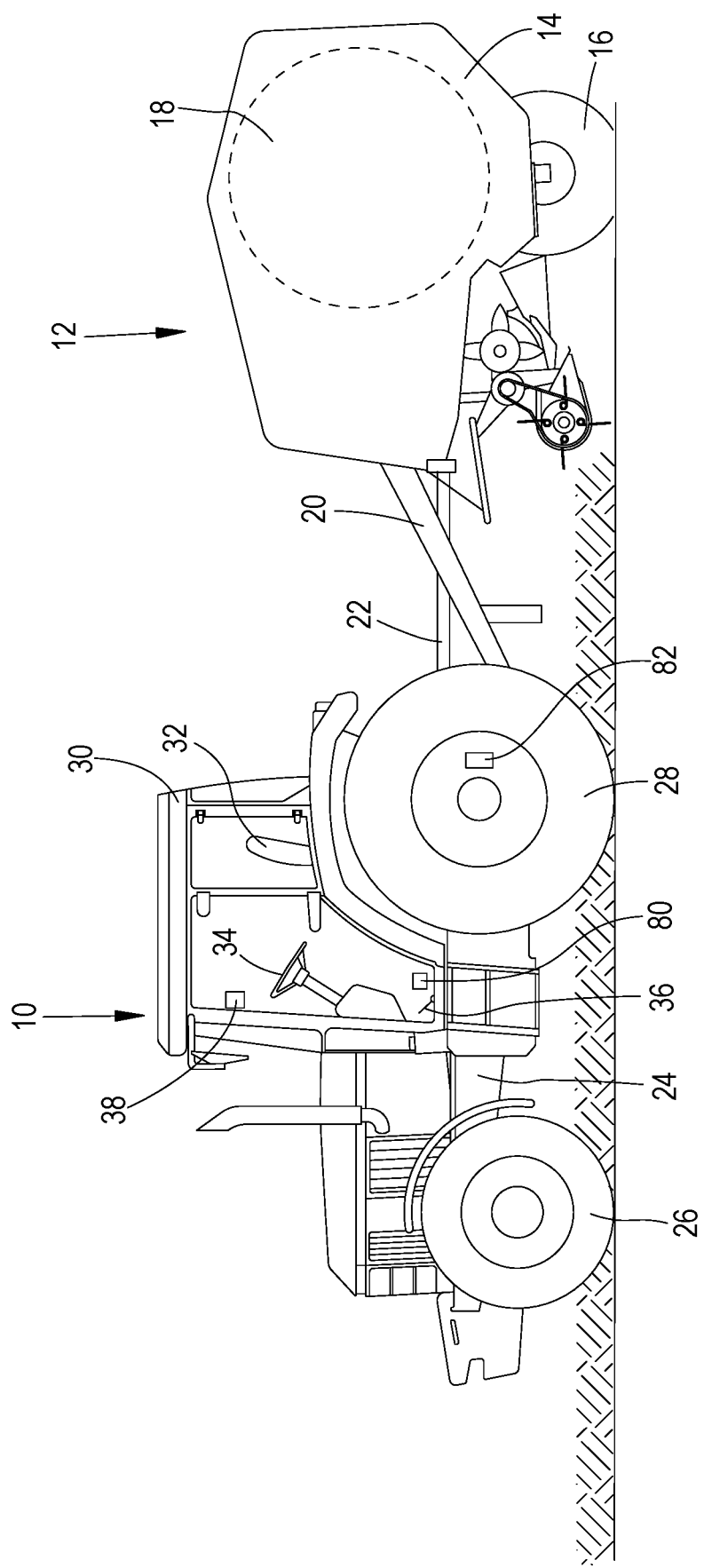
FIG. 1 illustrates a schematic representation of an agricultural working machine in accordance with an embodiment of the present disclosure.

FIG. 1 shows an agricultural working machine in the form of a tractor 10 and a round baler 12 pulled by the tractor 10. The round baler 12 includes a chassis 14 supported on wheels 16 with a bale forming chamber 18. The round baler 12 is pulled by a drawbar 20 from the tractor 10, and its drivable elements are driven by a PTO 22 from the tractor 10.

The tractor 10 includes a chassis 24 supported on front steerable wheels 26 and rear driven wheels 28. An operator workstation with a seat 32 is located in a cabin 30. A steering wheel 34, an accelerator pedal 36, and an operator interface 38 with a display and buttons and/or the touch-sensitive display can be operated from the seat.

In contemporary tractors, the PTO is often located centrally between the three-point linkage at the rear; on front mounted models, it is also located at the front. If the equipment is to be driven when the vehicle is stationary, the speed of the motor and thus the PTO speed is controlled with the accelerator pedal or hand throttle lever (cable winch, irrigation pumps). In tractors, for example, the PTO is used to drive water pumps, mowing machines, loader wagons and many other agricultural implements.

The transmission PTO is connected to the motor via the drive clutch and a transmission, and the constant nominal speeds are standardized. The two standard speeds 540/min and 1000/min are reduced in such a way that they are reached in the range of the nominal motor speed (maximum power).

With some PTO drive concepts, the main drive motor can be connected to the PTO, for example, via fixed transmission ratios. In order to obtain a standard PTO speed desired for the implement, the main drive motor must then be operated at its rated speed. Consequently, the power take-off speed intended for the working process determines the speed of the main drive motor.

In order to work with reduced diesel engine speed during PTO work with low power requirements and thus shift the operating point in the engine map to areas with lower specific fuel consumption, there are concepts with correspondingly adapted transmission ratios. Depending on the respective manufacturer or the respective equipment, up to four power take-off gears can be realized. However, these cannot be changed under load, so that these concepts cannot be used at all for field work with only temporary high power requirements (e.g. harvesting operation with balers).

In addition, the starting up of attachments with high moments of inertia (e.g. square balers) and/or load moments (e.g. feed mixers) leads to heavy loads during the coupling process, since the lack of load shifting capability means that it is often necessary to start up in a PTO transmission with a low transmission ratio.

When operating implements in front of or behind agricultural vehicles with PTO, a constant and specific PTO speed is required. Since the PTO is usually directly mechanically connected to the combustion engine, a constant engine speed is necessary. This, in turn, leads to restrictions in switching operations and in the design of the drive train.

From DE 10 2011 084 623 A1, a PTO transmission is known in which a drive shaft and two input shafts that can be coupled to it are arranged coaxially on one axis in order to drive a PTO offset to it via various selectable gear ratios, each formed by a spur gear pairing. This PTO transmission is at least partly shiftable under load. A disadvantage is the relatively large axial overall length of the PTO transmission due to the spur gear pairs arranged next to each other in the axial direction for each gear ratio.

PTO transmissions of various embodiments may be formed as two-stage transmissions. With conventional power take-off transmissions, shifting is often performed manually. It may not be possible to shift the PTO under load.

State-of-the-art solutions are known that reduce the dependence of the PTO on the motor speed. DE 26 47 141 A1 thus reveals a drive for the power take-off shaft of an agricultural vehicle, the power take-off shaft being connectable both to an output shaft for the vehicle drive and to a shaft coupled directly to the output shaft. Accordingly, it is possible to operate the PTO at both motor-dependent speed and drive-dependent speed. Two wheel sets are provided for motor-dependent operation. The shaft directly coupled to the motor carries two fixed gears, which can be brought into engagement with the chosen spur gears, which are slidably mounted on an input shaft of the power take-off transmission, if the gears are brought to the height of the assigned fixed gear with a claw coupling. The input shaft can in turn be connected to the PTO via a multi-plate clutch of the PTO transmission, the input shaft being coaxial with said PTO. The claw coupling for engaging and disengaging the spur gears of the two wheel sets can only be operated without load.

An alternative solution is known from DE 20 51 556 C2. Designed as a hollow shaft, the input shaft of the drive gear is connected to a double clutch. It carries gears of two different spur gear stages at opposite ends. The PTO extends axially parallel to a drive shaft and a countershaft. The fixed gears comb the lay shaft with the gearwheels that can be coupled via the double clutch. One of the fixed gears of the countershaft meshes with a loose gear assigned to the PTO. By actuating the double-clutch transmission, one of the assigned gears can be coupled as required and the torque transmitted via the output constant between the PTO and the countershaft.

Such PTO transmissions can be shifted under load, however. However, this is a two-stage transmission. In particular, the consumption-optimized operation of agricultural commercial vehicles with power take-off transmissions makes it necessary to adjust the speed applied to the power take-off shaft in an improved way to a speed resulting from economical operation of the drive motor. Certain agricultural implements, which are driven via the PTO, require different speed ranges.

With regard to the different agricultural implements, the nominal speeds of the power take-off shafts are now standardized. Nominal speeds of 540 revolutions per minute, 750 revolutions per minute, 1000 revolutions per minute and 1400 revolutions per minute have prevailed (standard gear ratio). These nominal speeds, also known as gear ratios, are applied to the PTO in the range of the nominal motor speed (maximum power).

For agricultural implements with low power consumption, it is not necessary to operate the PTO at nominal motor speed. For some time now, power take-off transmissions with so-called economy gear ratios have also been used for this purpose. For example, in the economy gear ratios 540E and 1000E, nominal speeds of 540 and 1000 rpm are already present at reduced motor speed, usually close to the highest motor torque, at approximately 1400 to 1600 rpm. This makes it possible to operate attachments with low power consumption and reduced fuel consumption.

The problem with non-load-shifting PTO transmissions is that the operator of the agricultural machine must set the appropriate transmission level on the PTO transmission before starting an operation. If this gear ratio is favorable under full load, the problem arises that, in the partial load range, an unsuitable gear ratio may be implemented at low torque, which may affect the operation of the agricultural implement and the motor.

Some PTO transmissions may not be shifted under load into the most appropriate gear ratio. Both load shiftability between the individual gear ratios (540 revolutions per minute, 750 revolutions per minute, 1000 revolutions per minute, 1400 revolutions per minute) and load shiftability between the economy gear ratios and the standard gear ratios or even between the economy gear ratios themselves are still not sufficiently available today.

The PTO transmissions may be equipped with a hydraulically actuated clutch, via which the PTO can be brought into drive connection with the drive shaft of the PTO transmission. The drive shaft is normally connected to the drive motor of the vehicle or to a drive train connected to the drive motor. EP 2 586 641 B1 describes a PTO transmission with a PTO clutch. A clutch disc pack is connected to a hydraulic reservoir.

DE 10 2011 084 622 A1 describes a power take-off transmission with a first and a second input shaft arranged concentrically to each other. One of the input shafts is designed as a hollow shaft. The other input shaft extends through this. The input shafts can be coupled via a double clutch device.

EP 2 628 625 B1 describes a tractor with a main motor and a power take-off transmission. A shaft comprises a first and a second shaft portion that are detachably connected to each other. In the released state, at least the first is axially displaceable into a separating position so that it is separated from the second shaft section by a gap. The first shaft portion has a tapered area.

The purpose of this disclosure is to provide an agricultural working machine with a power take-off shaft that has no restrictions on shifting operations. The disclosure is intended to enable a flexible design of the drive train. The working machine should be flexibly adaptable to the respective performance requirements. In addition, the working machine should be characterized by a long service life and low susceptibility to faults. Safety during operation should be increased compared to conventional machines. The design should be inexpensive to manufacture and have the lowest possible operating costs.

This task is solved according to the embodiments of this disclosure by an agricultural working machine, a power take-off transmission, and use according to the present disclosure.

According to the disclosure, the working machine has an arrangement for dynamically adjusting the speed and/or torque of the PTO. The arrangement comprises an electric machine and a transmission. The transmission adds up the driving force of the combustion engine and the electric machine.

This possibility of dynamically adjusting the speed and/or torque of the PTO has a significant advantage over conventional machines in which the PTO is mechanically connected to the internal combustion engine. In the case of the working machine according to the disclosure, it is possible to operate the PTO flexibly at a different speed and/or with different torques that are not rigidly coupled to the internal combustion engine. This avoids restrictions during switching operations.

Furthermore, the design according to the disclosure allows freedom in the design of the drive train. The greater independence of the PTO speed and/or torque from the combustion engine means that the PTO can be operated under the optimum conditions for the driveline. At the same time, the main motor driven by the combustion engine can be driven in the optimum operating mode.

According to the disclosure, a magnetic summing gear is used for the dynamic adaptation of the speed and torque of the PTO. Such magnetic summing gears are known in principle from DE 10 2013 021 224 A1, for example. The use of a magnetic summing gear for the dynamic adjustment of the speed and torque of the PTO has great advantages over the use of mechanical summing gears, for example. For example, mechanical superimposed transmissions must achieve very high transmission ratios and additional safety devices must be implemented to protect against overspeed, which entails a very high design effort and thus high costs.

A magnetic PTO drive can achieve high gear ratios in one stage and has inherent safety against overload.

In the case of the power take-off transmission according to the disclosure, at least two gear elements may be magnetically coupled to each other. A third gear element may also be magnetically coupled to at least one of the other two gear elements.

A torque is transmitted between the gear elements via magnetic fields. The rotation of a gear element generates a rotating magnetic field, which then exerts a force on another gear element. Transmission of a torque within the summing gear is contactless.

In a variant of the disclosure, the first gear element is an inner ring. It comprises magnetic elements that may be designed as permanent magnets. These may be aligned at a right angle to the main axis of rotation of the PTO transmission.

The second gear element may be designed as a center ring. The first gear element, which is designed as an inner ring, encloses it. The second gear element comprises magnetically conductive elements and magnetically non-conductive elements, which are arranged alternately in each case.

The third gear element may be designed as an outer ring. The gear element in the form of an outer ring is arranged radially outside the second gear element in the form of a central ring. The third gear element comprises magnetic elements aligned in a radial direction.

The magnetic PTO has a first input gear element to connect the combustion engine, a second input gear element to connect the electric machine, and an output gear element to drive the PTO. The output gear element may be connected to a power take-off clutch.

The electric machine may be designed in such a way that it can be operated both as a motor and as a generator.

In an embodiment, the electric machine is at least partially integrated into the magnetic PTO summing gear. The electric machine can be arranged directly around an outer ring of the magnetic power take-off transmission.

In an arrangement, the energy required to operate the electric machine is generated in an electric generator and transmitted to the electric machine without intermediate storage.

In principle, it is also conceivable that the generator and the electric machine are connected to at least one energy storage device. By connecting, the generator could charge the energy storage device and store electric energy for later use. In an operating mode in which only low electric power is required in the output, the electric power could be conducted to an accumulator or a battery. This would then be available for later retrieval in the event of power requirements.

In a variant of the disclosure, the arrangement has a braking device for the PTO. This allows the PTO to be fixed when no power is tapped. In this way, the design in accordance with the disclosure allows the generation of additional electric power with the electric machine.

The agricultural working machine may include a device designed to control and/or regulate the dynamic adaptation of the speed and torque of the power take-off shaft. This allows the transmitted speeds and/or torques to be varied, for example, if changes are made to the main drive and/or drive train. The device can, for example, regulate the relative speed of individual components of the magnetic PTO summing gear. The summation ratio of electric and mechanical power can therefore be set as follows. The facility can be used to control the power distribution in a targeted manner. It is therefore possible to implement a flexible power distribution that is adapted to the current load case. This can be done, for example, by setting the relative speeds of the magnetic PTO summing gear.

Figure 2:
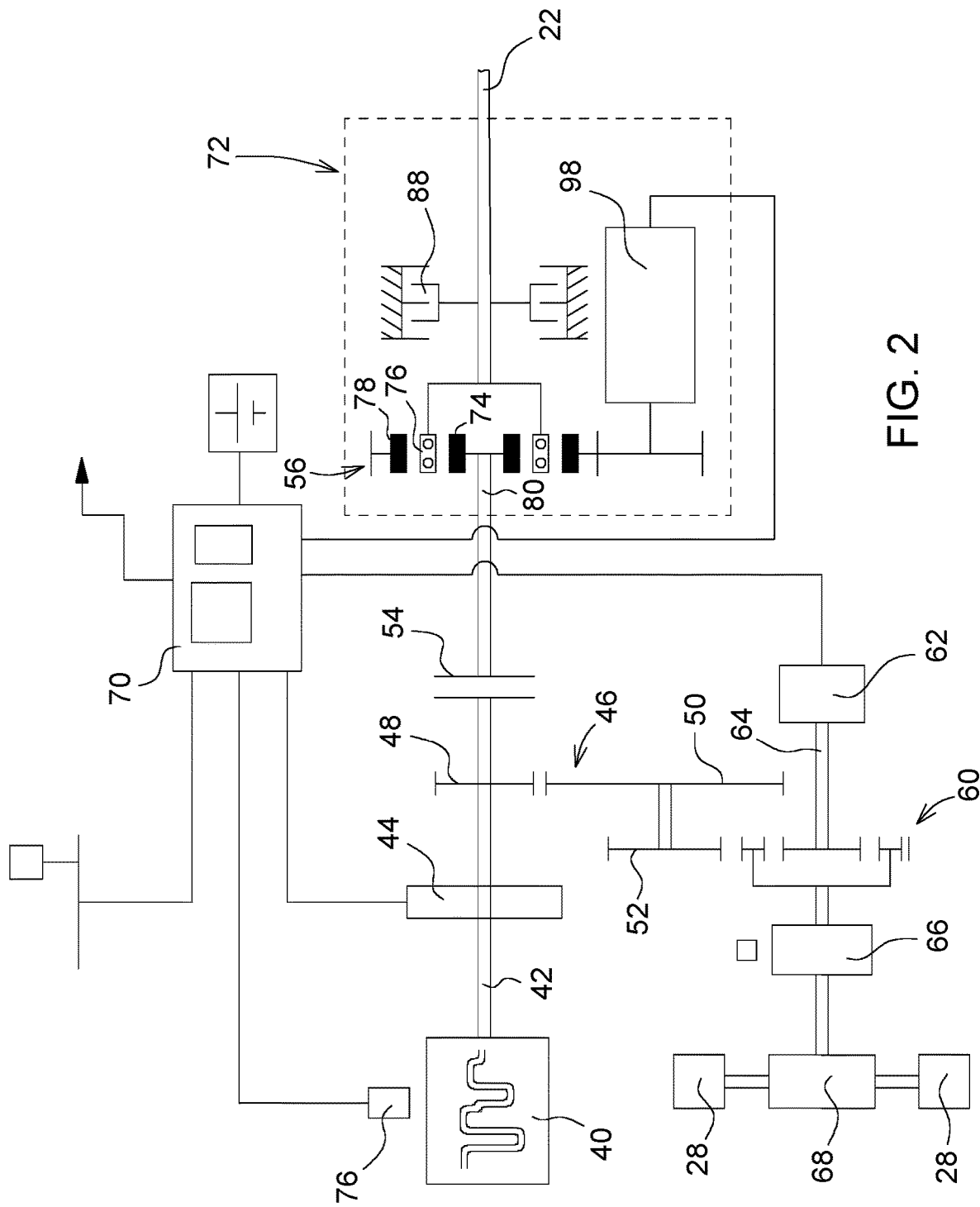
FIG. 2 illustrates a schematic representation of a drive train of a working machine in accordance with an embodiment of the present disclosure.

Referring now to FIG. 2, FIG. 2 shows the drive train of the working machine 10. The crankshaft of an internal combustion engine 40, usually designed as a diesel engine in an embodiment, drives a shaft 42, which in turn drives an electric generator 44, an intermediate gear 46 with toothed wheels 48, 50 and 52 and the input side of a PTO separating clutch 54.

The PTO separating clutch 54 is connected on the output side to the input of a PTO transmission 56. With the device according to the disclosure, the PTO transmission 56 can drive the PTO 22 directly, without the interposition of another PTO clutch.

The intermediate gear 46 is connected on the output side to a mechanical summing gear 60 in the form of a planetary gear whose ring gear meshes with the output gear 52 of the intermediate gear 46 and whose sun gear is connected to the output shaft 64 of an electric motor 62. The planetary gear carrier is coupled to the input side of a manual transmission 66, which drives the rear wheels 28 on the output side via a differential transmission 68.

In another version, not shown, the PTO transmission 56 can also be driven in the drive train downstream of the summing gear 60. In addition, the manual transmission 66 can be designed as a powershift transmission. In the case of another design form, which is also not shown, summing gear 60 can be assigned to the individual wheels 28 and possibly also to the front wheels 26. In another design, the electric motor 62 could transmit its torque directly or via a gear to the shaft 42 or another part of the drive train, i.e. the summing gear 60 could then be omitted and the electric motor 62 could take over the tasks of the generator 44.

Furthermore, the working machine has a device 70. In the embodiment example, this includes a sensor for detecting the speed of the PTO 22.

According to the disclosure, the working machine 10 has an arrangement 72 for dynamically adjusting the speed and/or torque of the PTO 22. The arrangement comprises at least one electric machine 98 and a power take-off transmission 56 that adds up the driving force of the internal combustion engine 40 and that of at least one electric machine 98. In accordance with the disclosure, the PTO transmission 56 is designed as a magnetic transmission. In the example, arrangement 72 has a braking device 88 for PTO 22.

Figure 3:
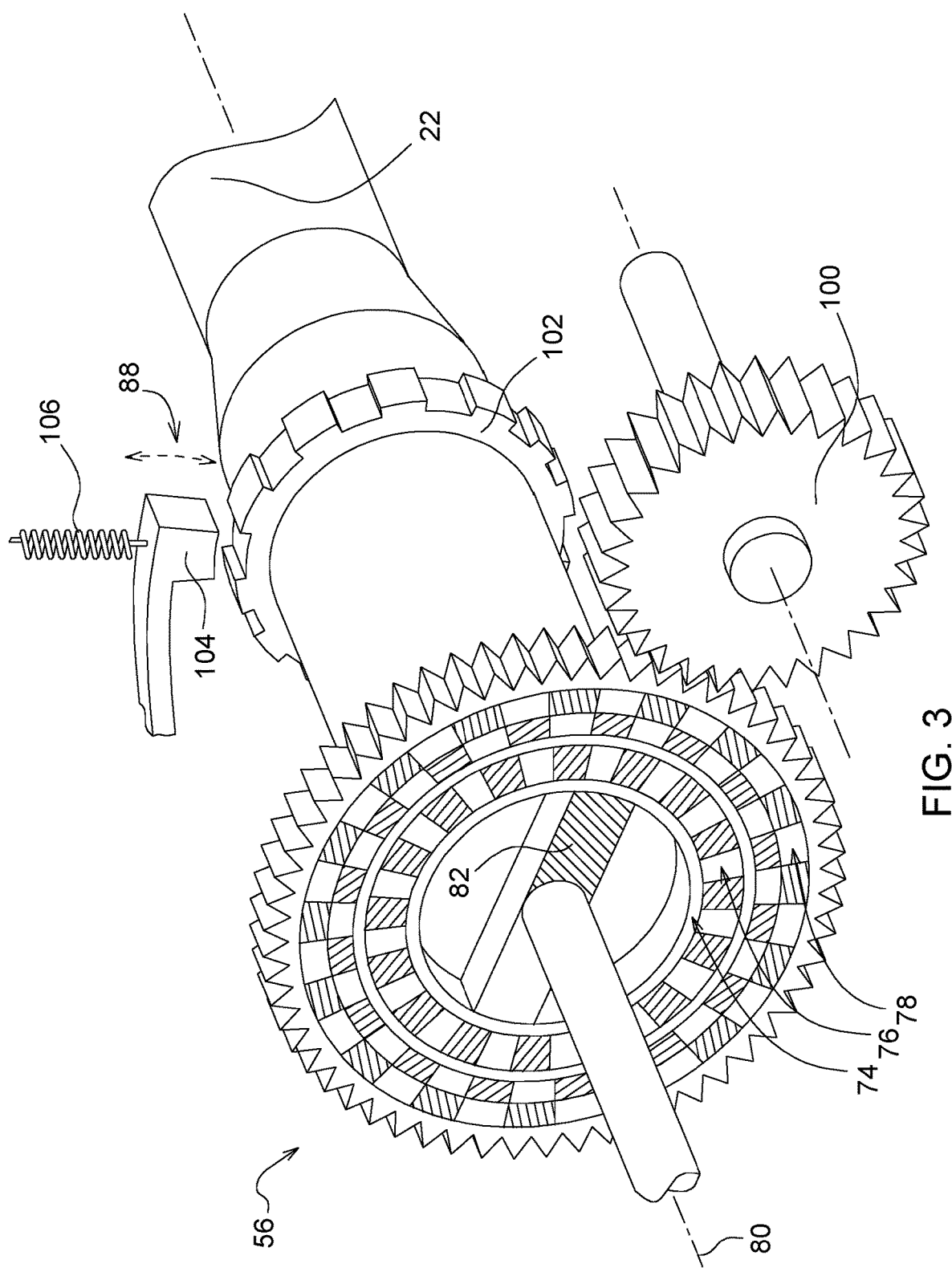
FIG. 3 illustrates a schematic representation of a power take-off transmission in accordance with an embodiment of the present disclosure.

FIG. 3 shows a schematic representation of the magnetic power take-off transmission 56. The power take-off transmission 56 comprises a first gear element 74, a second gear element 76 and a third gear element 78 magnetically coupled to each other. A torque is transmitted between the gear elements 74, 76 and 78 via magnetic fields. The rotation of a gear element 74, 76, 78 generates a rotating magnetic field, which then exerts a force on another gear element 74, 76, 78. Transmission of a torque within the magnetic power take-off transmission 56 is contactless.

The first gear element 74 is designed as an inner ring. The gear element 74 is arranged coaxially to a main rotation axis 80 of the magnetic power take-off transmission 56. The first gear element 74, designed as an inner ring, comprises a magnetic element 82. The magnetic element 82 is designed as a permanent magnet in the example, and as a rod magnet in an embodiment. The magnetic element 82 is aligned at a right angle to the main rotation axis 80. The magnetic element 82 has a north pole and a south pole. The north pole is arranged at one radial end of the magnetic element and the south pole at an opposite radial end.

The second gear element 76 is designed as a center ring and completely encloses the first gear element 74, designed as an inner ring, in one circumferential direction.

The second gear element 76 comprises magnetically conductive elements and magnetically non-conductive elements. The magnetically conductive elements and the magnetically non-conductive elements are arranged alternately. The magnetically conductive elements and the magnetically non-conductive elements are firmly connected to each other.

The third gear element 78 is designed as an outer ring. The gear element 78 is arranged radially outside the second gear element 76 in the form of a central ring. The third gear element 78 comprises magnetic elements. The magnetic elements are permanently integrated in the gear element 78, which is designed as an outer ring.

The magnetic elements are distributed over the entire 360 degrees of the annular gear element and are aligned in a radial direction. A north pole and a south pole of a magnetic element each lie in an imaginary axis that runs radially outward from the main rotation axis 80.

A polarization of two adjacent magnetic elements of the third gear element 78 is complementary such that the north pole of one magnetic element is directed radially inward in the direction of the main rotation axis and the north pole of the circumferentially adjacent magnetic element is directed radially outward from the main rotation axis.

Equivalent to this, the south pole of one magnetic element is then directed radially outward from the main axis of rotation and the south pole of the neighboring magnetic element in the circumferential direction is directed radially inward in the direction of the main axis of rotation. All magnetic elements of the third gear element 78 are arranged in reverse polarization to the adjacent magnetic elements.

The magnetic elements of the third gear element 78, which is designed as an outer ring, can be designed as permanent magnets. In this variant, the magnetic PTO transmission 78 has a fixed transmission ratio.

In an embodiment of the disclosure, which is not shown in the figures, the magnetic elements are designed as controllable solenoid coils, so that the magnetic PTO transmission 56 can form a variable transmission by means of a special control and thus a continuously variable variation is possible.

The power of the combustion engine 40 is coupled into the PTO transmission 56 via the internal gear element 74. The output element, which transmits the power to the PTO 22, is the middle gear element 76 in the embodiment example. In the embodiment example, the magnetic PTO transmission 56 is coupled to the electric machine 98 via the outer gear element 78 by means of a toothed wheel 100.

The braking device 88 for the PTO 22 has a ring 102, which is arranged around the PTO 22 and is connected to the PTO in a rotationally fixed manner. The ring 102 has recesses. An element 104 can engage in the recesses to brake the PTO 22. The brake can be actuated and/or released via a component 106.

Figure 4:
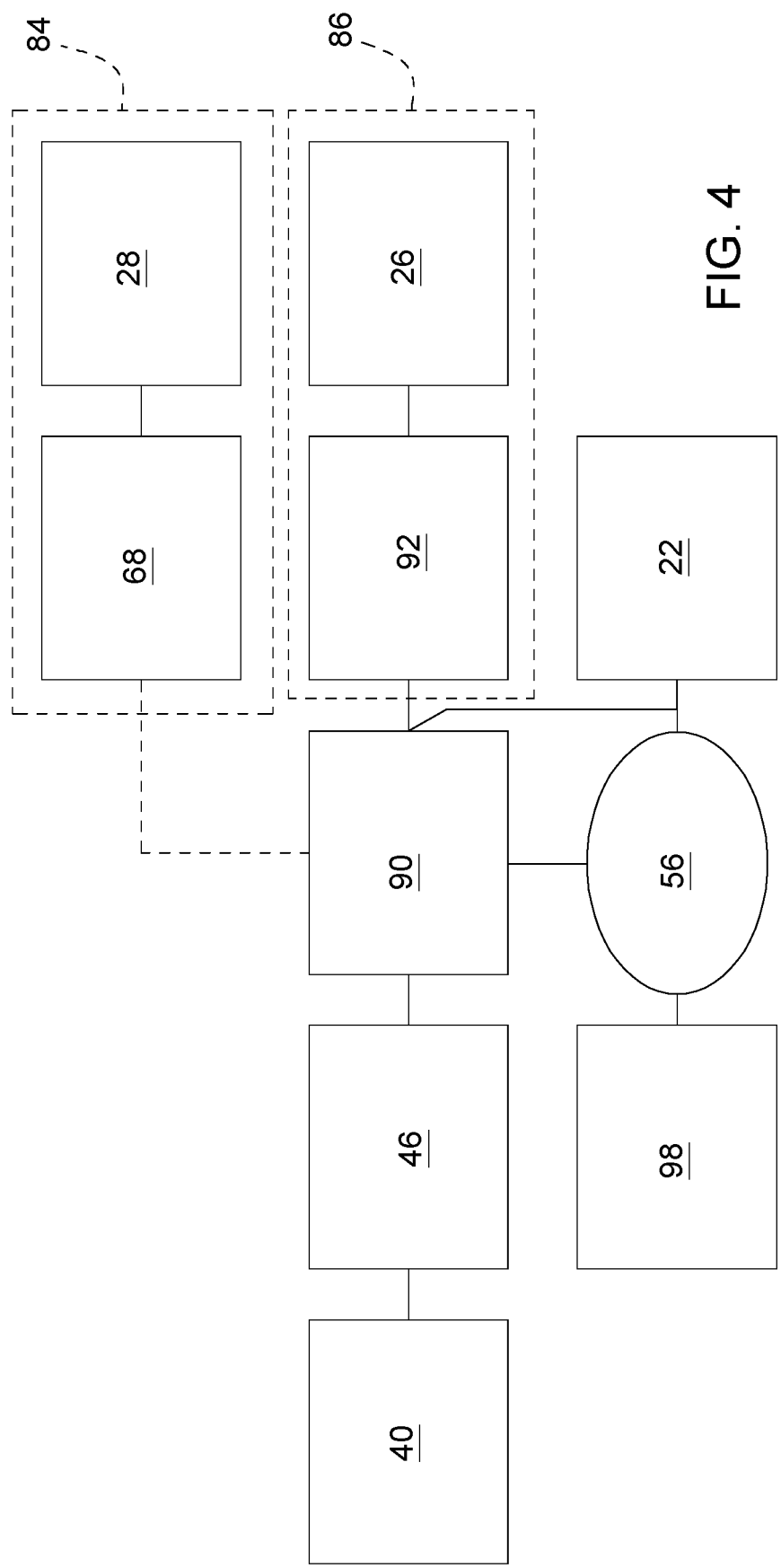
FIG. 4 shows a flow chart for an operation of a working machine in accordance with an embodiment of the present disclosure.

FIG. 4 shows a flow chart for the operation of the working machine 10.

A front axle 84 and a rear axle 86 of the working machine 10 designed as a tractor can be driven via a mechanical power path. The mechanically generated power of an internal combustion engine 40 is fed to a mechanical stage 90 and then to a front axle differential 92 and/or a rear axle differential 68 by means of a manual/automatic transmission 46. The mechanical stage 90 may be designed as a toothed wheel stage.

The transmission 46 is used to adapt the torque or speed of the power output to the application. A mechanical stage 90 allows the mechanically generated power of the combustion engine to be divided between a front and/or rear axle drive.

In the embodiment example, the rear axle drive has a rear axle differential 68 to which the output means of the rear axle are connected. The output means can consist of a differential gear, a planetary gear or a rotating gear, and serve to modify the speed and/or torque again before it is transmitted to the wheels.

According to the disclosure, the power take-off shaft 22 of the auxiliary drive can be supplied with power by a mechanical and/or an electrical path. The power path for the PTO 22 according to the disclosure comprises a magnetic summing gear 56, which bundles the power of the mechanical and electrical paths and transmits it to the PTO 22.

The electric machine 98 is connected to the magnetic PTO transmission 56. In the magnetic PTO transmission 56, the mechanical power path is added to the electrical power path and routed to the PTO 22.

The arrangement 72 for dynamic adjustment of the speed and/or the torque of the PTO 22 makes it possible to additionally dose the power from the electric path as required. The electric machine 98 is controlled by the device 70 so that the electric machine 98 can influence the magnetic PTO transmission 56 by its electric drive in such a way that the power is summed according to demand. The summation factor can be determined depending on the speed or torque requirement.

The control and/or regulation device 70 can also be used to control a generator so that it can be switched on or off as required.

The electrical power path allows additional electric power to be supplied to the PTO 22 by means of the device 70 for control and/or regulation if necessary. The electrical power path does not pass through the transmission 46 in at least one embodiment, so it is not charged by the summed power.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An agricultural working machine with an internal combustion engine and an auxiliary drive, the agricultural working machine comprising:
   at least one power take-off;
   an arrangement for dynamically adjusting at least one of a speed and a torque of the PTO;
   wherein the arrangement comprises an electric machine and a transmission summing the driving force of the internal combustion engine and the electric machine;
   wherein the transmission comprises at least two gear elements that are magnetically coupled; and
   wherein the transmission comprises a first gear element for connecting the internal combustion engine, a second gear element for connecting the electric machine, and a third gear element for driving a power take-off shaft of the power take-off.

2. The agricultural working machine according to claim 1, wherein the third gear element is connected to a power take-off clutch.

3. The agricultural working machine according to claim 1, wherein the electric machine is at least partially integrated in the transmission.

4. The agricultural working machine according to claim 1, wherein each of the first gear element, the second gear element, and the third gear element is formed as one of an internal ring, an external ring, and a central ring, and wherein the first gear element, the second gear element, and the third gear element are magnetically coupled with each another.

5. The agricultural working machine according to claim 4, wherein the electric machine is arranged directly around the external ring.

6. The agricultural working machine according to claim 4, wherein at least one of the first gear element, the second gear element, and the third gear element is an external ring having magnetic elements.

7. The agricultural working machine according to claim 4, wherein at least one of the first gear element, the second gear element, and the third gear element is an external ring generating a magnetic field with coils.

8. The agricultural working machine according to claim 1, wherein the arrangement has a braking device for the power take-off.

9. The agricultural working machine according to claim 1, wherein the arrangement comprises a generator that generates energy to operate the electric machine and directs the energy to the electric machine without interim storage.

10. The agricultural working machine according to claim 1, wherein the working machine has a device configured to control a dynamic adaptation of the speed and the torque of a power take-off shaft of the power take-off.

11. The agricultural working machine according to claim 1, wherein the electric machine is configured to operate as a generator and as an engine.

12. A method of operating a magnetic transmission with a power take-off transmission, the method comprising:
   dynamically adjusting a speed and a torque of a power take-off shaft in an agricultural machine, wherein the power take-off transmission comprises at least two transmission elements magnetically coupled to each other; and
   wherein the power take-off transmission sums the driving force of an internal combustion engine and an electric machine; and
   wherein the power take-off transmission comprises a first gear element for connecting the internal combustion engine, a second gear element for connecting the electric machine, and a third gear element for driving the power take-off shaft.

13. A power take-off transmission for transmitting drive torque to a power take-off, the power take-off transmission comprising:
   an arrangement for dynamically adjusting at least one of a speed and a torque of the power take-off with an electric machine configured to be connected to an electrical network; and
   at least three transmission elements, wherein one of the at least three transmission elements is configured to be connected to an internal combustion engine and another of the at least three transmission elements is connected to the electric machine and another of the at least three transmission elements is connected to a power take-off shaft of the power take-off such that a third transmission stage sums initiated torque of the internal combustion engine and the electric machine, wherein at least two of the at least three transmission elements are magnetically coupled to each other.

* * * * *